US009779302B1

(12) United States Patent
Wu et al.

(10) Patent No.: US 9,779,302 B1
(45) Date of Patent: Oct. 3, 2017

(54) SYSTEM FOR OPTIMIZING STORAGE LOCATION ARRANGEMENT

(71) Applicant: Intel Corporation, Santa Clara, CA (US)

(72) Inventors: Michael Wu, San Jose, CA (US); Addicam V. Sanjay, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/087,076

(22) Filed: Mar. 31, 2016

(51) Int. Cl.
*G06K 9/00* (2006.01)
*G06T 7/70* (2017.01)
*G06Q 10/08* (2012.01)
*G06K 19/077* (2006.01)
*G06T 7/00* (2017.01)
*H04N 7/18* (2006.01)

(52) U.S. Cl.
CPC ..... *G06K 9/00671* (2013.01); *G06K 9/00624* (2013.01); *G06K 19/07758* (2013.01); *G06Q 10/087* (2013.01); *G06T 7/004* (2013.01); *G06T 7/70* (2017.01); *H04N 7/181* (2013.01)

(58) Field of Classification Search
CPC ........... G06K 9/00671; G06K 9/00771; G06K 9/6253; H04N 7/18
See application file for complete search history.

(56) References Cited

U.S. PATENT DOCUMENTS 6,696,945 B1 2/2004 Venetianer et al.
7,742,952 B2 * 6/2010 Bonner ..................... G01S 5/14
370/406

(Continued)

FOREIGN PATENT DOCUMENTS

CN 103971103 A 8/2014
KR 10-2012-0080436 A 7/2012

OTHER PUBLICATIONS

Zhang, et al.; "Water Filling: Unsupervised People Counting via Vertical Kinect Sensor;" Advanced Video and Signal-Based Surveillance (AVSS), 2012 IEEE Ninth International Conference; Sep. 18-21, 2012, 8 pages.
Wateosot, et al.; "Top-view Based People Counting Using Mixture of Depth and Color Information;" The Second Asian Conference on Information Systems, ACIS 2013; Oct. 31-Nov. 2, 2013, Phuket, Thailand; 6 pages.

(Continued)

*Primary Examiner* — Thomas Randazzo
(74) *Attorney, Agent, or Firm* — Grossman, Tucker, Perreault & Pfleger, PLLC

(57) ABSTRACT

This disclosure is directed to a system for optimizing storage area arrangement. A system control device may manage location control devices in various locations. Each location may comprise storage areas accessible to trackable targets. At least a portion of the storage areas may be arranged in parallel to form aisles that may be monitored by aisle monitoring equipment. The monitoring equipment may comprise at least two sensing devices capable of capturing data such as, for example, a count of trackable objects accessing an aisle or a storage area, time spent within the aisle or proximate to a storage area, characteristics of the trackable object (e.g., gender, age, etc.), etc. The captured data may then be analyzed by the system control device to determine whether a change in arrangement is necessary. A change in arrangement may help to alleviate bottlenecks, improve the efficiency of paths taken through the aisles/storage areas, etc.

24 Claims, 9 Drawing Sheets

(56) References Cited

U.S. PATENT DOCUMENTS

| | | | |
|---|---|---|---|
| 7,798,342 B2 * | 9/2010 | Pustinger | A47F 5/0018 211/119.003 |
| 8,140,378 B2 * | 3/2012 | Sorensen | G06Q 30/02 705/7.29 |
| 8,189,926 B2 * | 5/2012 | Sharma | G06K 9/00771 382/103 |
| 8,229,781 B2 * | 7/2012 | Zenor | G06Q 30/02 705/7.31 |
| 8,238,607 B2 | 8/2012 | Wang et al. | |
| 8,812,344 B1 | 8/2014 | Saurabh et al. | |
| 8,860,811 B2 * | 10/2014 | Golan | G06K 9/00771 348/150 |
| 8,965,561 B2 * | 2/2015 | Jacobus | G06Q 10/087 700/214 |
| 9,020,189 B2 | 4/2015 | Lee et al. | |
| 2007/0067220 A1 | 3/2007 | Godsey et al. | |
| 2011/0029997 A1 | 2/2011 | Wolinsky | |
| 2011/0176000 A1 | 7/2011 | Budge et al. | |
| 2013/0182904 A1 | 7/2013 | Zhang et al. | |
| 2014/0139633 A1 | 5/2014 | Wang et al. | |
| 2014/0304123 A1 * | 10/2014 | Schwartz | G06Q 10/087 705/28 |
| 2015/0310372 A1 | 10/2015 | Golan et al. | |

OTHER PUBLICATIONS

Izadi, Saeed; "How to count people crossing a virtual line using a top-view camera (of the height 3.5m to the ground)"; Computer Vision Online; http://www.computervisiononline.com/; Mar. 13, 2011; 2 pages.

International Search Report and Written Opinion issued in PCT Application No. PCT/US2017/015414, dated May 2, 2017, 15 pages.

* cited by examiner

SYSTEM FOR OPTIMIZING STORAGE LOCATION ARRANGEMENT

TECHNICAL FIELD

The present disclosure relates to control systems, and more particularly, to a system that may monitor storage location traffic and optimize access by reconfiguring location arrangement.

BACKGROUND

The increasing pressures of modern existence have placed an emphasis on the effective utilization of time. Manufacturers must build products faster, distributors must get the products to retailers faster, and retailers must make it easy for consumers to quickly receive the products. Material and product handling plays a key role in facilitating this speed of delivery. Bottlenecks and/or inefficiencies in handling materials and products may upset the planned manufacturing or delivery of the products, and thus may cause consumers to consider other available options. The importance of this efficiency may be compounded in instances where automatic material/product handling (e.g., automatic or robotic warehousing) is being utilized as these resources may not be able to easily adjust or compensate for unplanned delivery delays. In another example scenario, products that are presented directly to a consumer for purchase may be arranged in a manner that facilitates easy selection and procurement. If these products are not arranged in a manner that is beneficial to the consumer, then the consumer may elect to consider secondary products that may be more conveniently arranged because they facilitate a more expeditious shopping experience.

In general, an arrangement may be "optimized" when changes are made that improve the performance for users. For example, in an automated handling system an arrangement of storage areas (e.g., bins, shelves, racks, etc.) may be optimized when the overall amount of congestion, bottlenecks is reduced, item retrieval speed is increased and an overall improvement in system performance is optimized. Similarly, in a retail sales situation where products may be presented to consumers in storage areas comprising, for example, aisles of products displayed on shelves, endcaps, etc., the consumer experience may be optimized when a consumer may enter a store, and locate various products of interest, and complete the shopping trip in an expeditious manner. Realizing any improvement in storage location arrangement is very difficult because of the large number of parameters to consider based on, for example, the situation in which the arrangement is utilized, the characteristics of the particular storage environment, the manner which the storage areas are accessed, the consumption of the products in certain storage areas and how popularity may affect demand and consumption, etc. Given that realizing improvements is very difficult, optimization of storage location arrangement is currently improbable due to overall complexity.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
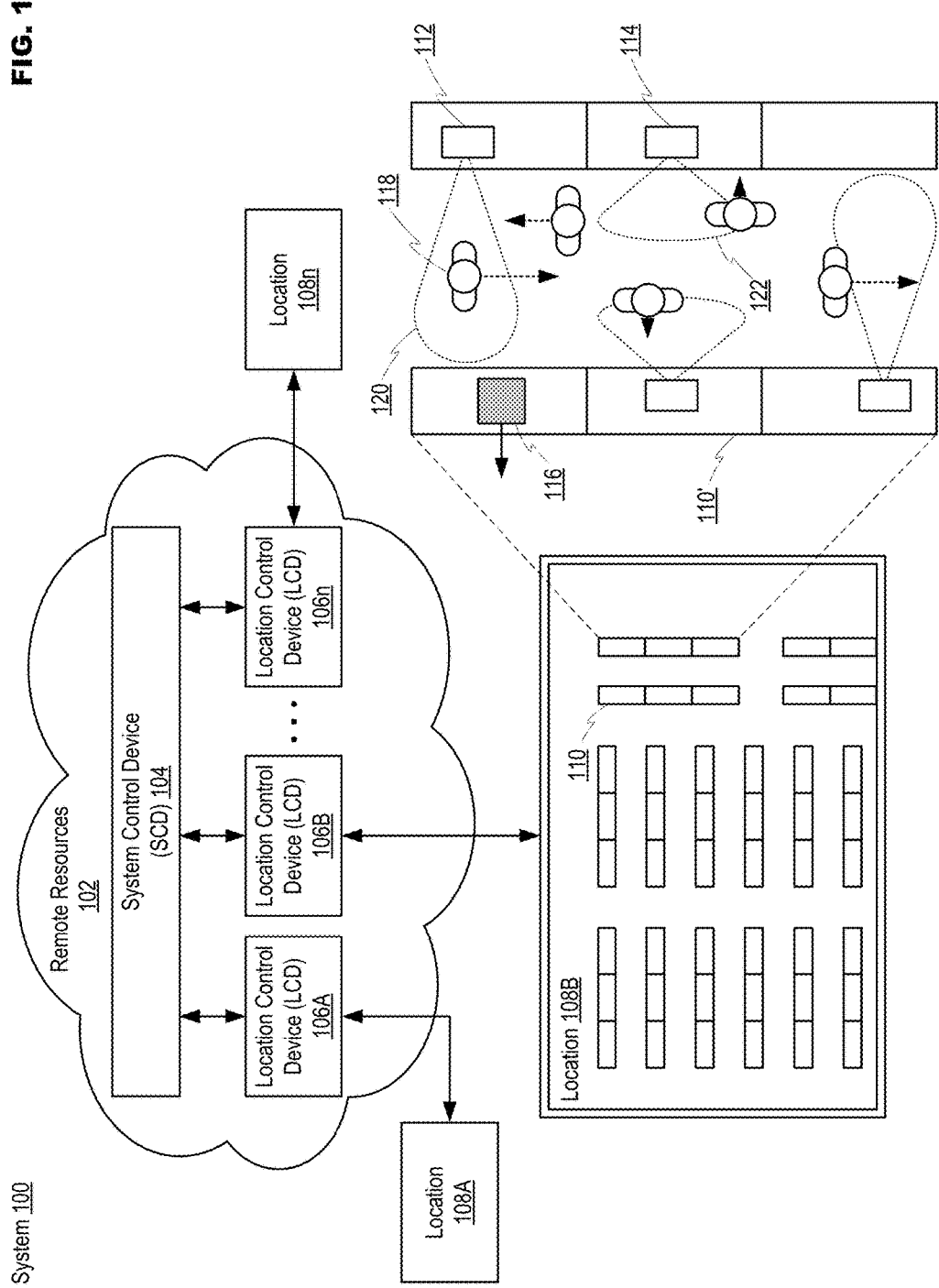
FIG. 1 illustrates an example of a system for optimizing storage location arrangement in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a system for optimizing storage location arrangement. In general, a system control device may manage location control devices in various locations. Each location may comprise storage areas accessible to trackable targets. For example, at least a portion of the storage areas may be arranged in parallel to form aisles that may be monitored by aisle monitoring equipment. The aisle monitoring equipment may comprise, for example, at least two sensing devices (e.g., video/depth capture devices) and may be capable of capturing various data such as, for example, a count of trackable objects accessing an aisle or a storage area, time spent within the aisle or proximate to a storage area, characteristics of the trackable object (e.g., gender, age, etc.), etc. In one embodiment the monitoring equipment may further comprise an aisle controller to accumulate data from the at least two sensing devices. The captured data may then be analyzed by the system control device to determine whether a change in arrangement is necessary. A change in arrangement may help to alleviate bottlenecks, improve the efficiency of paths taken through the aisles/storage areas, etc. The system control device may then transmit changes in arrangements to the location control devices, which may automatically implement the changes or present data to local operators prompting the changes.

In at least one embodiment, an example device to control storage location arrangement may comprise at least communication circuitry, memory circuitry and processing circuitry. The communication circuitry may be to communicate with at least one location control device corresponding to a location including storage areas that are accessible to trackable targets. The memory circuitry may be to store at least arrangement data and traffic data for the location received from the at least one location control device via the communication circuitry. The processing circuitry may be to analyze the traffic data, determine if a change in arrangement for the storage areas in the location is required based on the analysis and provide a change in arrangement to the at least one location control device via the communication circuitry based on the change in arrangement determination.

In at least one embodiment, at least a portion of the storage areas may be arranged in parallel forming at least one aisle between the storage areas, and the traffic data is accumulated for each aisle by at least two sensing devices to capture at least visible data and depth data. For example, first and second sensing devices may be arranged at ends of the aisle on opposing sides of the aisle, and third and fourth sensing devices may be arranged at a midpoint of the aisle on opposing sides of the aisle, the third and fourth sensing devices sensing with higher precision but at shorter range that then first and second sensing devices. The traffic data may comprise at least one of a count of trackable targets passing through the at least one aisle, a rate at which the at least one trackable target passes through the at least one aisle, a duration that the trackable targets pause adjacent to at least one storage area or characteristic data corresponding to the trackable targets. In analyzing the traffic data, the processing circuitry may be to at least one of determine how often storage areas are being accessed by the trackable targets, determine bottlenecks occurring proximate to storage areas or in the at least one aisle, or determine paths followed by the trackable targets through the location and efficiencies associated with the target paths. The arrangement data may comprise data describing at least one of an arrangement of storage areas in the location or an arrangement of items stored within each of the storage areas. In providing a change in arrangement, the processing circuitry may be to transmit to the at least one location controller a signal including data instructing how to rearrange at least one storage area within the location.

Consistent with the present disclosure, an example device to control a storage location may comprise communication circuitry to communicate with at least one of a system control device or aisle monitoring equipment corresponding to an aisle in a location, the aisle being formed by a parallel arrangement of storage areas that are accessible to trackable targets, memory circuitry to store at least arrangement data and traffic data for the location and processing circuitry to receive the traffic data from aisle monitoring equipment and provide the traffic data to the system control device via the communication circuitry. The aisle monitoring equipment may comprise at least first and second sensing devices are arranged at ends of the aisle on opposing sides of the aisle, and third and fourth sensing devices are arranged at a midpoint of the aisle on opposing sides of the aisle, the third and fourth sensing devices sensing with higher precision but at shorter range that then first and second sensing devices. The aisle monitoring equipment may further comprise an aisle control device to at least receive traffic data from the first, second, third and fourth sensing devices and provide the traffic data to the device. The processing circuitry may further be to receive data from the system control device via the communication circuitry, the data indicating a change to the arrangement of the location. An example method for controlling storage location arrangement may comprise receiving at least arrangement data and traffic data corresponding to a location including storage areas that are accessible to trackable targets, analyzing the traffic data, determining if a change in arrangement for the storage areas in the location is required based on the analysis and providing a change in arrangement to the at least one location control device via the communication circuitry based on the change in arrangement determination.

FIG. 1 illustrates an example of a system for optimizing storage location arrangement in accordance with at least one embodiment of the present disclosure. The following disclosure may make reference to, or may use terminology commonly associated with, certain technologies for sensing comprising, but not limited to, video data capture, depth data capture, face detection, facial feature recognition, data processing, etc. These examples are provided merely for the sake of explanation, and are not intended to limit any of the various embodiments consistent with the present disclosure to any particular manner of implementation. While the above technologies provide a basis for understanding these embodiments, actual implementations may utilize other technologies existing now or developed in the future. Moreover, the inclusion of an apostrophe after a drawing item number (e.g., 100') in the present disclosure may indicate that an example embodiment of the particular item is being illustrated merely for the sake of explanation herein.

As referenced herein, a "storage location" or just "location" may refer to any indoor or outdoor storage area, structure, building, storage facility, etc. that may comprise storage areas accessible to trackable targets. Example storage locations may comprise, but are not limited to, assembly plants, distribution centers, warehouses, retail facilities such as grocery stores, "big box" stores, specialized stores, etc. Example "storage areas" may comprise, but are not limited to, floor space, closets, cabinets, racks, shelves, drawers, bins, tanks, etc. Example "items" may comprise, but are not limited to, raw and/or processed materials and foodstuffs, components of finished goods, finished goods, etc. Example trackable targets may comprise anything that may access a storage area. Example trackable targets may comprise, but are not limited to, various people (e.g., workers, consumers, etc.), items that may be associated with people (e.g., clothing, bags, carts, pallet trucks, etc. that may possibly comprise trackable identification such as radio frequency identification (RFID) tags), automated equipment (e.g., robots and robotic devices such as automated material handlers including order pickers, forklifts, etc.) configured to gather components and items for manufacturing, to fill purchase orders, etc. A first example scenario referenced herein may comprise a grocery store (e.g., location) including aisles of shelves (e.g., storage areas) from which shoppers (e.g., trackable targets) select consumer goods (e.g., items) for purchase. A second example scenario referenced herein may comprise an assembly plant (e.g., location) including storage areas from which workers/robots (e.g., trackable targets) may access materials (e.g., items) for use in assembly. These examples have been selected merely to provide context for the following disclosure, and are not meant to limit the various embodiments.

Example system 100 in FIG. 1 may comprise remote resource 102. Remote resources 102 may comprise at least one device that is capable of processing data and is accessible via a network such as, for example, a global-area network (GAN), a wide-area network (WAN) like the Internet, a local-area network (LAN), etc. An example implementation may comprise one or more data processing devices (e.g., servers) in a "cloud" computing arrangement. The servers in remote resources 102 may operate separately or collaboratively to perform various tasks related to optimizing storage location arrangement. In at least one embodiment, remote resources 102 may comprise system control device (SCD) 104 and location control device (LCD) 106A, LCD 106B . . . LCD 106n (collectively, "LCDs 106A . . . n") that may each correspond to location 108A, location 108B . . . location 108n, respectively (collectively, "locations 108A . . . n"). While SCD 104 and LCDs 106A . . . n are illustrated within remote resources 102, alternative configurations consistent with the present disclosure are possible. For example, some or all of LCD 106A . . . n may reside in locations 108A . . . n, respectively. Moreover, while only three locations 108A . . . n are shown in FIG. 1, less or more locations 108A . . . n may exist in system 100 depending on, for example, the intended use for system 100, the capabilities of the equipment in system 100, etc.

SCD 104 may be configured to at least receive traffic data from LCDs 106A . . . n, analyze the traffic data and then determine if a change in arrangement is required based on the analysis. "Traffic data" as referenced herein may comprise data sensed based on trackable target activity within locations 108A . . . n. Examples of traffic data will be described further below regarding FIG. 5. Changes in arrangement may comprise, for example, a reorganization of storage areas within one or all of locations 108A . . . n, a relocation of items in the storage areas, a relocation of aisles formed by the storage areas, etc. LCDs 106A . . . n may manage operations in each of locations 108A . . . n. For example, LCDs 106A . . . n may accumulate traffic data within locations 108A . . . n, may provide the accumulated traffic data to SCD 104, may receive data from SCD instructing a change in arrangement, etc. Moreover, SCD 104 and/or LCDs 106A . . . n may be capable of other control functions such as, but not limited to, inventory tracking and statistical analysis, (e.g., item popularity analysis, waste analysis for perishable goods, inventory holding analysis including aged inventory, etc.), automated replenishment, purchase order tracking, etc.

LCDs 106A . . . n may manage operations within locations 108A . . . n. Location 108B is presented as a representative example configuration of locations 108A . . . n. Location 108B may comprise one or more storage areas 110. As shown in location 108B, storage areas 110 may be arranged proximate to other storage areas 110, such as in the instance of supermarket shelving wherein many possible storage areas 110 exist in a set of shelving. The shelving may then be arranged parallel to each other to form aisles through which consumers may pass. An example of this arrangement is shown in greater detail in FIG. 1 wherein at least three storage areas 110' are arranged end-to-end, and then these combined units are arranged in parallel to form an aisle. Monitoring equipment including at least sensing devices 112 arranged on the ends of the aisle and sensing devices 114 at the midpoint of the aisle make capture data regarding trackable targets 118 (e.g., consumers as shown in FIG. 1). In at least one embodiment, sensing devices 112 and 114 may be selected to be different devices, or may at least be differently configured, to serve different purposes in system 100. For example, sensing devices 112 may capture less-detailed data over longer distances as shown at 118 to at least detect trackable targets 118 moving into and out of the aisle. Sensing devices 114 may capture more-detailed data over shorter distances as illustrated at 122 for performing higher level detection such as gender determination and age estimation based on, for example, face detection, feature extraction from the detected face, etc. In this manner, traffic data may be collected on the activity of trackable targets 118 in the aisle. Example traffic data may include a count of trackable targets 118 entering and exiting the aisle, the speed at which trackable targets 118 move through the aisle, durations of time that trackable targets 118 spend in the aisle or proximate to storage areas 110', characteristics of trackable targets 118, etc. In at least one embodiment, the aisle monitoring equipment may also comprise aisle control device (ACD) 116 to locally accumulate the data sensed by sensing devices 112 and 114. ACD 116 may accumulate the traffic data from sensing devices 112 and 114 and may then provide the traffic data to LCD 106B (e.g., for accumulation and forwarding to SCD 104).

Figure 2:
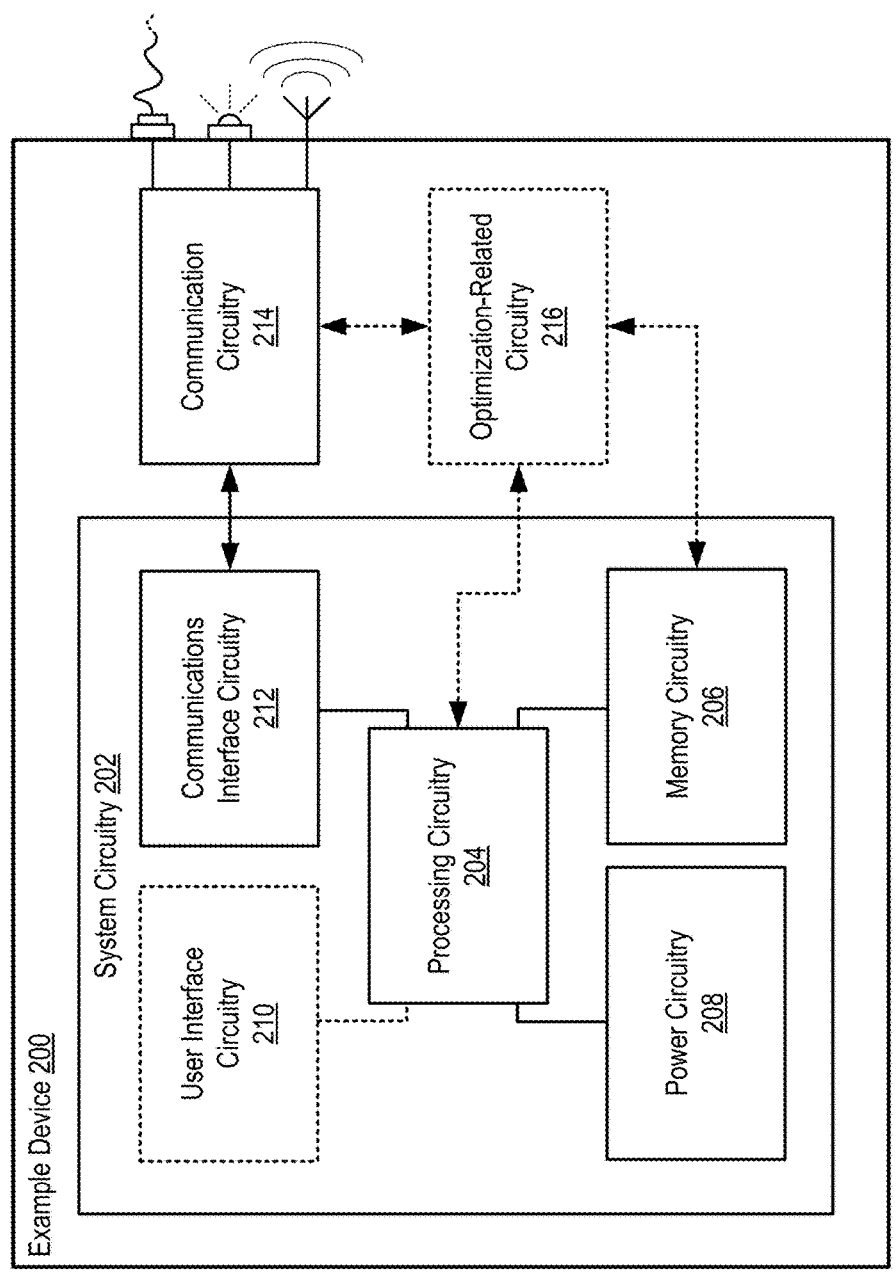
FIG. 2 illustrates an example configuration for devices usable in accordance with at least one embodiment of the present disclosure.

FIG. 2 illustrates an example configuration for a device usable in accordance with at least one embodiment of the present disclosure. Device 200 is presented as an example platform that may be capable of performing the various activities associated with SCD 104, LCD 106A . . . n or ACD 116. Examples of device 200 may include, but are not limited to, mobile communication devices such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., mobile computing devices such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., wearable devices such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., typically stationary computing devices such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc. While some or all of the above devices may be usable to fulfill various functional roles in accordance with the present disclosure, device 200 is presented only as an example, and is not intended to limit any of the various embodiments disclosed herein to a particular manner of implementation. Moreover, while illustrated as only one apparatus in FIG. 2, device 200 may also be made up of multiple apparatuses configured to operate collaboratively.

System circuitry 202 may manage the operation of device 200. System circuitry 202 may comprise, for example, processing circuitry 204, memory circuitry 206, power circuitry 208, user interface circuitry 210 and communication interface circuitry 212. Device 200 may also include communication circuitry 214 and optimization-related circuitry 216. While communication circuitry 214 and optimization-related circuitry 216 are shown as separate from system circuitry 202, device 200 is provided merely for the sake of explanation in regard to various embodiments. Possible variations may include some or all of the functionality of communication circuitry 214 and/or optimization-related circuitry 216 being incorporated into system circuitry 202.

In device 200, processing circuitry 204 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in Pentium®, Xeon®, Itanium®, Celeron®, Atom™, Quark™, Core i-series, Core M-series product families, Advanced RISC (e.g., Reduced Instruction Set Computing) Machine or "ARM" processors, microcontrollers, programmable logic controllers, etc. Examples of support circuitry may include chipsets (e.g., Northbridge, Southbridge, etc. available from the Intel Corporation) to provide an interface through which processing circuitry 204 may interact with other system components that may be operating at different speeds, on different buses, etc. in device 200. Moreover, some or all of the functionality commonly associated with the support circuitry may also be included in the same package as the processor (e.g., such as in the Sandy Bridge, Broadwell and Skylake families of processors available from the Intel Corporation).

Processing circuitry 204 may be configured to execute various instructions in device 200. Instructions may include program code configured to cause processing circuitry 204 to perform activities related to reading data, writing data, processing data, formulating data, converting data, transforming data, etc. Information (e.g., instructions, data, etc.) may be stored in memory circuitry 206. Memory circuitry 206 may comprise random access memory (RAM) and/or read-only memory (ROM) in a fixed or removable format. RAM may include volatile memory configured to hold information during the operation of device 200 such as, for example, static RAM (SRAM) or Dynamic RAM (DRAM). ROM may include non-volatile (NV) memory circuitry configured based on BIOS, UEFI, etc. to provide instructions when device 200 is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 208 may include, for example, internal power sources (e.g., a battery, fuel cell, etc.) and/or external power sources (e.g., electromechanical or solar generator, power grid, external fuel cell, etc.), and related circuitry configured to supply device 200 with the power needed to operate. User interface circuitry 210 may include hardware and/or software to allow users to interact with device 200 such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). Hardware in user interface circuitry 210 may be included in device 200 and/or may be coupled to device 200 via a wired or wireless communication medium.

Communication interface circuitry 212 may be configured to manage packet routing and other control functions for communication circuitry 214, which may include resources configured to support wired and/or wireless communications. In some instances, device 200 may comprise more than one set of communication circuitry 214 (e.g., including separate physical interface circuitry for wired protocols and/or wireless radios) managed by centralized communication interface circuitry 212. Wired communications may include serial and parallel wired mediums such as, for example, Ethernet, USB, Firewire, Thunderbolt, Digital Video Interface (DVI), High-Definition Multimedia Interface (HDMI), DisplayPort, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 212 may be configured to prevent wireless communications that are active in communication circuitry 214 from interfering with each other. In performing this function, communication interface circuitry 212 may schedule activities for communication circuitry 214 based on, for example, the relative priority of messages awaiting transmission. While FIG. 2 illustrates communication interface circuitry 212 and communication circuitry 214 as separate, it may also be possible for the functionality of communication interface circuitry 212 and communication circuitry 214 to be combined in the same circuitry.

Consistent with the present disclosure, optimization-related circuitry 216 may comprise circuitry configured to perform functionality related to optimizing storage location arrangement. For example, optimization-related circuitry 216 may comprise circuitry to initialize, configure, calibrate, etc. sensing devices 112 and 114, accumulate traffic data, analyze traffic data, determine changes in arrangement, etc. In at least one embodiment, Optimization-related circuitry 216 may comprise only hardware (e.g., firmware-driven control circuitry) or a combination of hardware and software. For example, processing circuitry 204 may cause program files, code, data, etc. stored in NV memory in memory circuitry 206 may be loaded into volatile memory in memory circuitry 206 and then executed by processing circuitry 204 to transform processing circuitry 204 from general data processing circuitry into specialized circuitry corresponding to optimization-related circuitry 216. During operation, optimization-related circuitry 216 may interact with at least processing circuitry 204, memory circuitry 206 and communication circuitry 214. Traffic data may be transmitted and/or received via communication circuitry 214. Memory circuitry 206 may store arrangement data, traffic data, etc. Optimization-related circuitry 216 may then utilize processing circuitry 204 when accumulating traffic data, analyzing traffic data, determining if a change in arrangement is required, etc. If a change in arrangement is required, optimization-related circuitry 216 may transmit the change of arrangement via communication circuitry 214.

Figure 3:
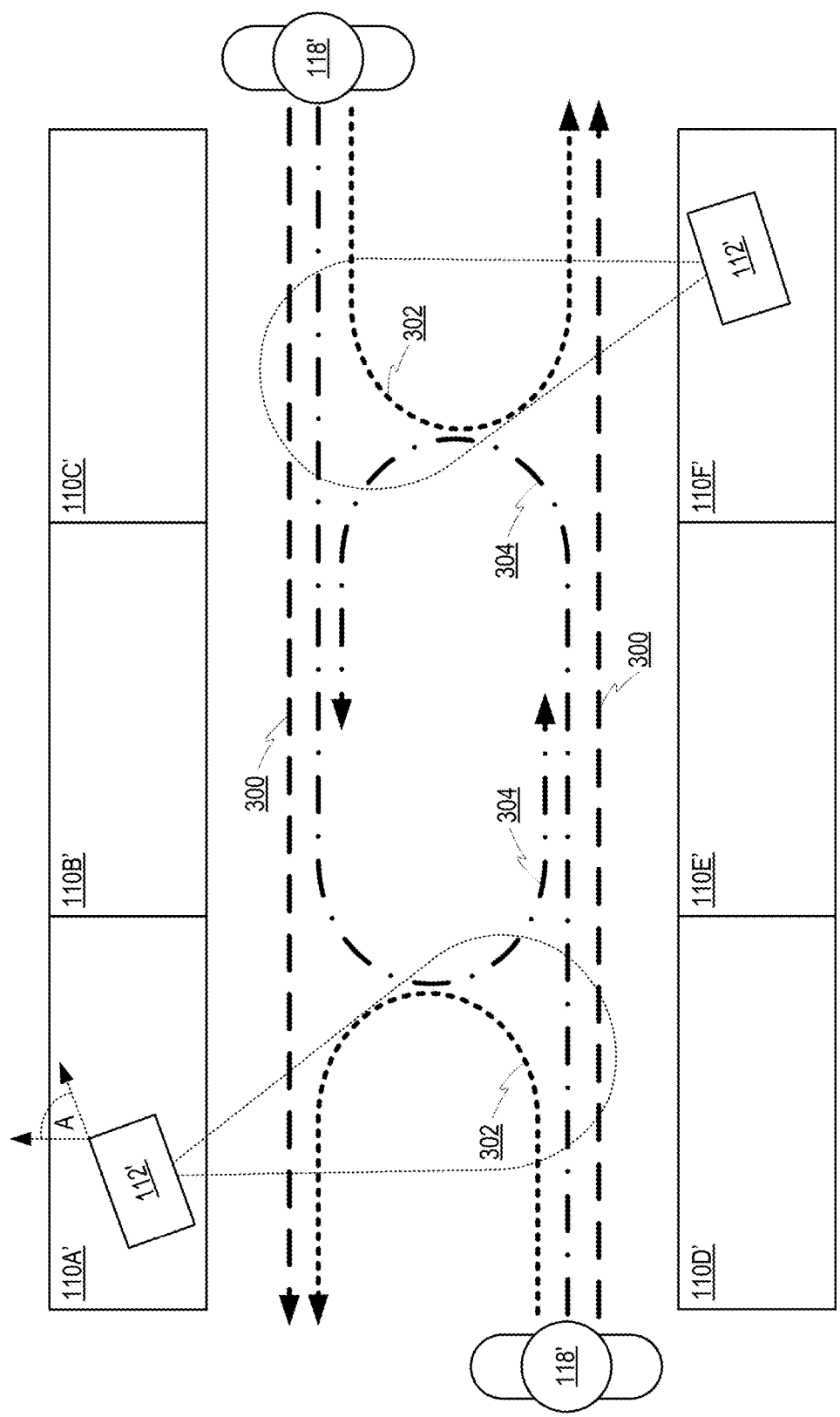
FIG. 3 illustrates an example configuration for sensing devices in an aisle viewed from an overhead perspective in accordance with at least one embodiment of the present disclosure.

FIG. 3 illustrates an example configuration for sensing devices in an aisle viewed from an overhead perspective in accordance with at least one embodiment of the present disclosure. In at least one embodiment, storage area 110A', storage area 110B' and storage area 110C' may each comprise shelves, drawers, bins, tanks, etc. accessible to trackable targets 118', and may also be arranged end-to-end to form a first row of storage areas 110. Storage area 110D', storage area 110E' and storage area 110F' may be similarly configured and may also be arranged to form a second row.

While three storage areas 110 are shown within each row, the number of storage areas 110 may be implementation specific, and so each row may include more or less storage areas 110. The first and second rows formed by the above storage areas 110 may be arranged in parallel to form an aisle through which trackable targets 118' access the above storage areas 110.

At least two sensing devices 112' may be arranged on either end of the aisle. While more sensing devices 112' may be employed, using one at each end may accomplish the goal of sensing traffic data from all trackable targets 118' moving through the aisle while minimizing resource consumption, cost, etc. In at least one embodiment, sensing devices 112' may be rotated slightly inwards (e.g., as shown by angle "A" in FIG. 3) to improve target sensing contact. For example, sensing devices 112' may be rotated inward approximately 65 degrees. Sensing device 112' may be utilized to count trackable targets 118' moving through the aisle, and the configuration shown in FIG. 3 may count with 100% accuracy regardless of the path taken by trackable targets 118'. For example, trackable targets 118' may move straight through the aisle as shown at 300, may enter, reverse direction and then leave the aisle from the same side that was entered after only a short distance as shown at 302, or may enter, reverse direction and then leave the aisle from the same side that was entered after a longer distance as shown at 304. Duplicative counting (e.g., based on counting the same trackable target 118' more than once) may be avoided using at least one algorithm. An algorithm to avoid duplicative counting will be discussed in regard to FIG. 6.

Figure 4:
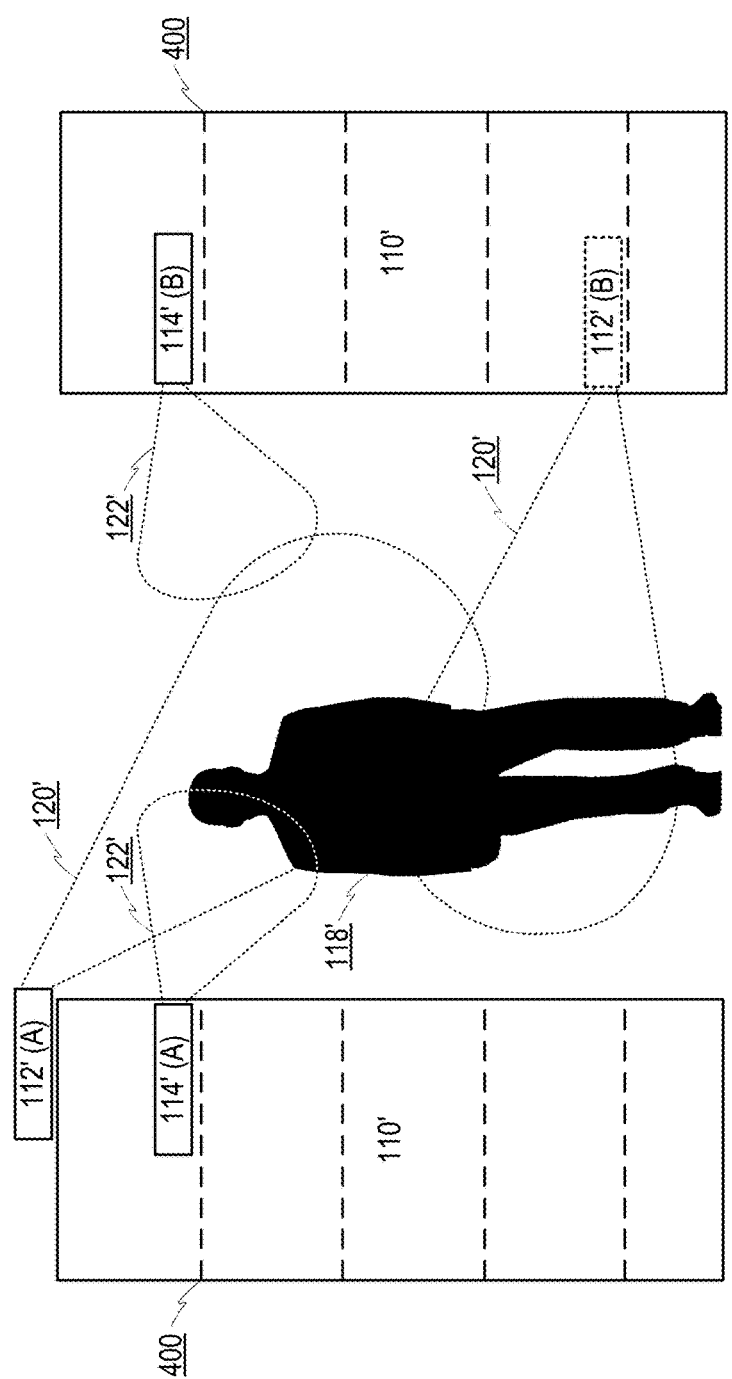
FIG. 4 illustrates an example configuration for sensing devices in an aisle viewed from a sideways perspective in accordance with at least one embodiment of the present disclosure.

FIG. 4 illustrates an example configuration for sensing devices in an aisle viewed from a sideways perspective in accordance with at least one embodiment of the present disclosure. For example, storage areas 110' may comprise various item storage areas 400. An example of item storage area 400 may be a shelf in a shelving unit (e.g., as used in a grocery, department store, warehouse, etc. to hold various items). In at least one embodiment, trackable targets 118' may have heights falling in a range of dimensions. Moreover, when trackable targets 118' are people, the level of each person's face may vary based on height. As a result, sensing devices 112' and sensing devices 114' may be positioned in or on storage areas 110' to ensure that traffic data may be fully captured from 100% of the trackable targets 118' moving through the aisle.

For example, sensing device 112' (A) is shown at a high level position with downward focused sensing area 120'. In this manner, at least the torso of all trackable targets 118' above a certain height may be captured. Moreover, sensing certain trackable targets 118' (e.g., children) may be avoided by focusing the sensing area 120' above a certain height. In a second example, sensing device 112' (B) is shown at a low level. A low position may allow sensing device 112' to capture 100% of trackable targets 118' moving through the aisle. Moreover, sensing devices 114' (A) and 114' (B) may be arranged at a level to allow for the complete capture of traffic data from trackable target 118'. For example, sensing devices 114' (A) and 114' (B) may be placed at a level that may help to ensure that there will be at or near a 100% chance of clearly capturing image and depth data from the faces of trackable targets 118' moving through the aisle, stopping proximate to storage areas 110', etc.

Figure 5:
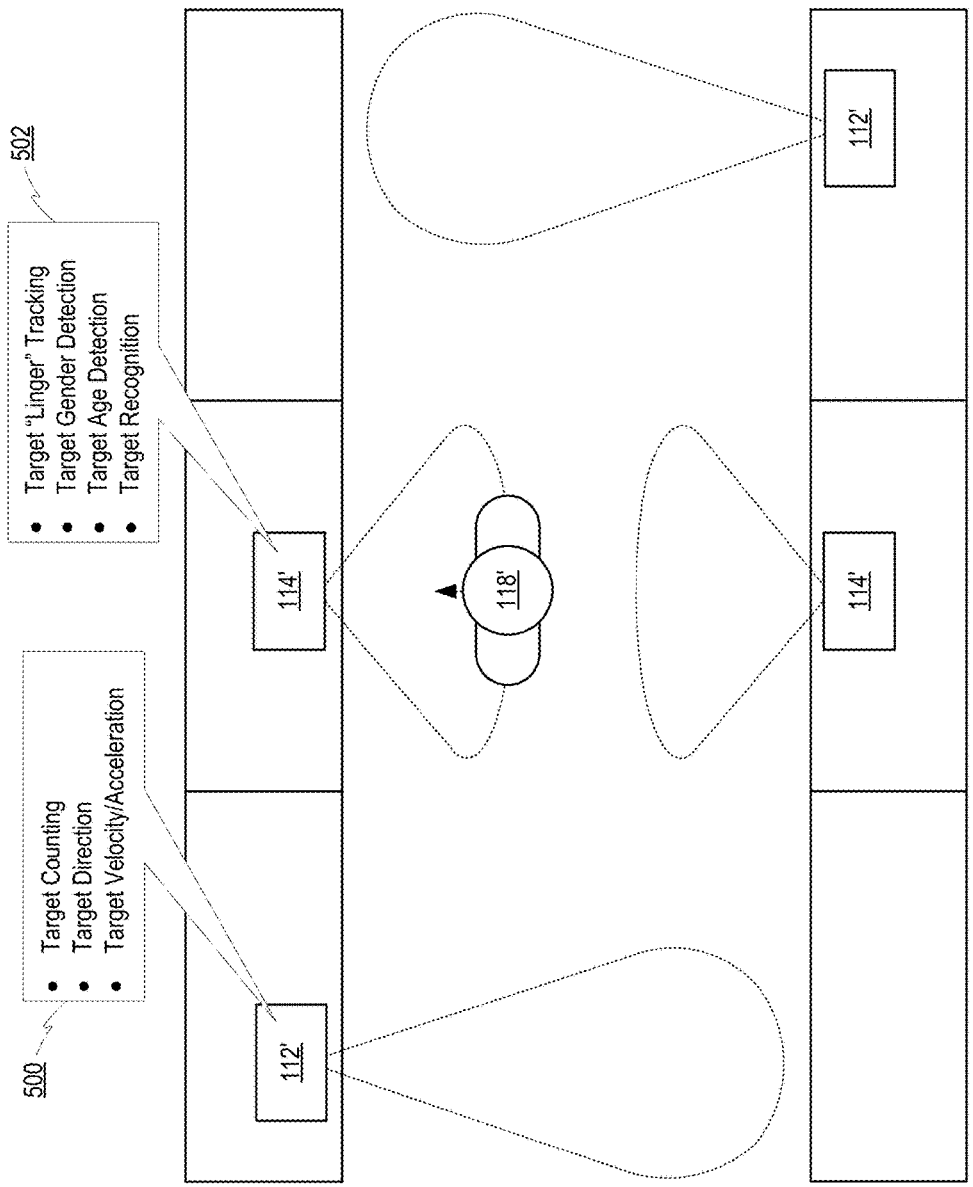
FIG. 5 illustrates examples of data collected regarding trackable targets in accordance with at least one embodiment of the present disclosure.

FIG. 5 illustrates examples of data collected regarding trackable targets in accordance with at least one embodiment of the present disclosure. In general, traffic data may pertain to behaviors and characteristics of trackable targets 118' as they move through the aisle, stop in front of storage areas 110, etc. For example, sensing devices 112' may be configured to capture traffic data such as shown at 500. The traffic data may comprise, but is not limited to, counting the number of trackable targets 118' entering the aisle, determining a direction of movement for trackable targets 118', determining a velocity and/or acceleration for trackable targets 118', etc. Upon analysis, trackable data may be used to determine, for example, whether trackable targets 118' are actually interested in items in the aisle or are just passing through the aisle, if a traffic flow problem (e.g., a bottleneck) exists in the aisle or adjacent to a storage area 110 (e.g., in which a popular item is stored), whether a safety issue exists in the aisle (e.g., a blind spot where trackable targets 118' commonly stop to access a storage area 110), what items interest trackable targets 118', if items need to be moved to alternative storage areas 110 to alleviate an issue, etc.

Sensing devices 114' may also capture traffic data. Further traffic data, as shown at 502, may include determining whether trackable targets 118' are "lingering" (e.g., pausing and/or stopping) in front of certain storage areas 110, detecting faces for trackable targets 118' and/or performing feature detection within the faces to determine a gender for trackable targets 118', an age for trackable targets 118', recognizing trackable targets 118' as being previously sensed, etc. This traffic data may be used to determine interest in certain items stored in storage areas 110, the demographics of trackable targets 118' interested in certain items, whether trackable targets 118' are selecting certain items upon first inspection or if the trackable targets 118' leave the aisle and then return later for further consideration before selecting the certain item, whether certain times need to be relocated to alternative storage areas 110, etc.

Figure 6:
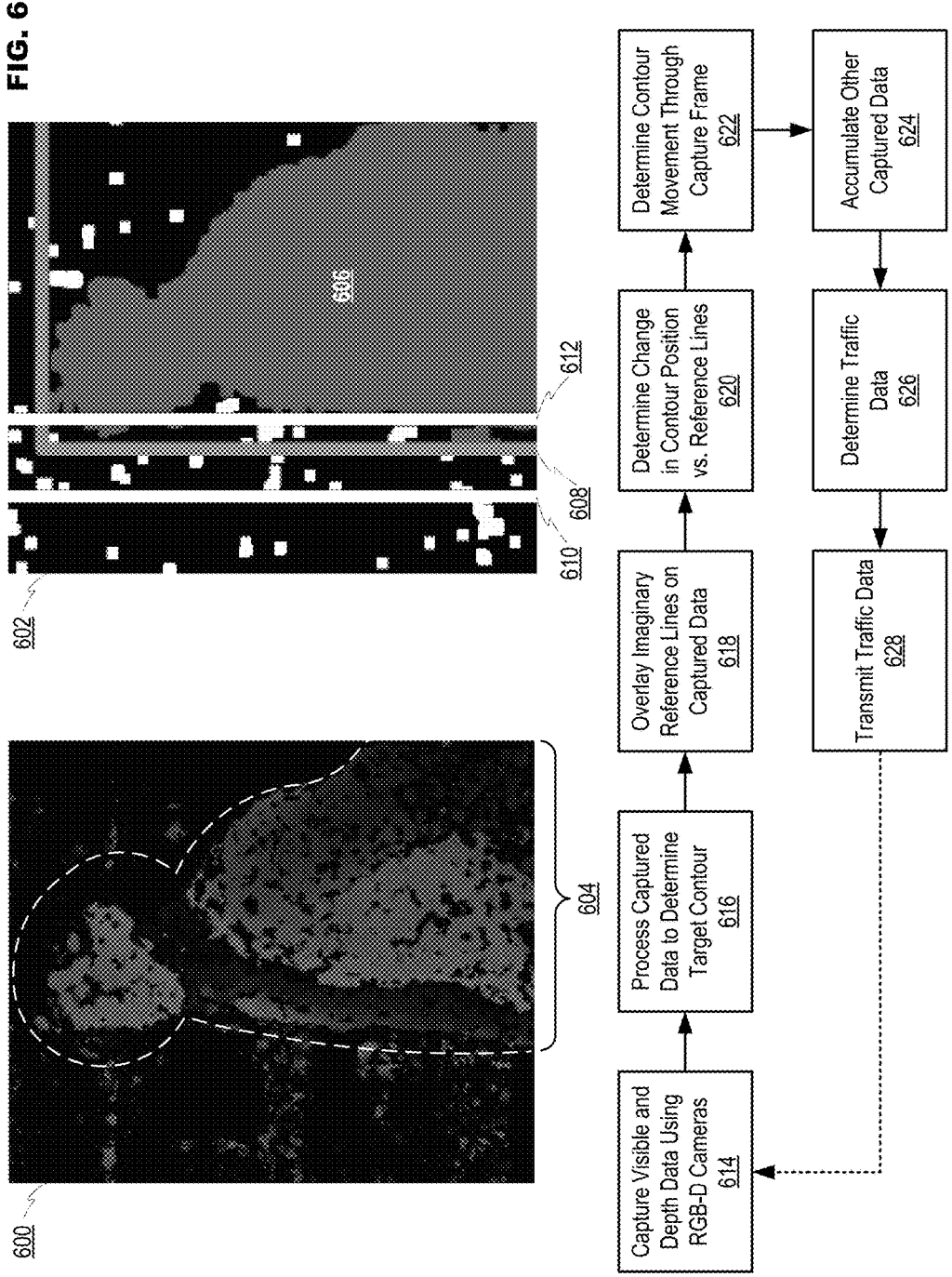
FIG. 6 illustrates example images and operations for trackable target counting utilizing visual and depth data in accordance with at least one embodiment of the present disclosure.

FIG. 6 illustrates example images and operations for trackable target counting utilizing visual and depth data in accordance with at least one embodiment of the present disclosure. In the examples shown at 600 and 602 in FIG. 6, sensing device 112 may capture image and depth data. In an example implementation, sensing device 112 may be a RealSense R200 camera from the Intel Corporation configured for red, green, blue and depth (RGBD) sensing. The image and depth data may be captured, for example, near access points to the aisle. Example 600 illustrates that the captured data may first be processed to determine if any trackable targets 118 exist in the image. In example 600 an outline has been added to highlight that image 604 of trackable target 118 is present. Image 604 may be determined based on the visible and/or depth data captured by sensing device 112. Trackable target 118 may then be counted. Example 602 demonstrates how analysis may be employed to determine at least a relative direction of travel for trackable target 118. In example 602, contour 606 has been determined for image 604 detected in example 600, and relevant points in contour 606 have been used to fit frame 608 to contour 606. Imaginary reference lines 610 and 612 may be overlaid for use in determining relative motion for frame 608. While imaginary reference lines 610 and 612 are illustrated visibly in example 602, this is merely for the sake of explanation. In at least one embodiment, a frame-by-frame analysis may then occur to determine a position of contour 606 and/or frame line 608 with respect to reference lines 610 and 612. For example, contour 606 overlapping reference line 612 in a first frame and then overlapping reference line 610 in a subsequent frame may indicate that trackable target 118 is moving to the left. In a similar manner, contour 606 overlapping reference line 610 in a first frame and then overlapping reference line 612 in a subsequent frame may indicate that trackable target 118 is moving to the right.

Example operations for performing the above functionality are illustrated at 614 to 628 in FIG. 6. Visible data (e.g., images, video, etc.) and depth data may be captured in operation 614. The captured data may then be processed in operation 616 to determine the target contour. The operations involved in the processing of the data may comprise, but are not limited to, grabbing a depth map frame for each image frame, determining thresholds for the image frame based on the depth frame, eroding and/or dilating the image frame based on the depth frame, finding contours in the image frame based on the depth frame, filtering noise in the image frame and then finding relevant contour points in the image frame. In operation 618 imaginary reference lines 610 and 612 may be overlaid on the image frame. A change in contour position may then be determined in operation 620. This determination may comprise determining whether contour 606 overlays one of imaginary reference lines 610 or 612 in a first frame, and then determining whether the position of contour 606 has changed to overlay the other of the reference lines 610 or 612 in a subsequent frame. In operation 622 movement of contour 606 through the image capture frame may be determined based on the results of operation 622. In at least one embodiment, velocity may also be determined based on, for example, the number of frames it takes for contour 606 to traverse from first crossing reference lines 610 or 612 to the other of reference lines 610 or 612. Operations 624 to 628 pertain to the accumulation and transmission of traffic data. For example, in operation 624 other captured data may be accumulated. For example, sensing devices 114 may be RealSense F200 RGBD cameras from the Intel Corporation that may be capable of capturing image data, performing face detection, extracting facial features, etc. Data from sensing devices 112 and 114 may be accumulated in operation 624. Accumulation may comprise, for example, correlating data sensed by sensing devices 112 with data sensed by sensing device 114 based on time, events, identification of trackable targets 118, etc. Traffic data may then be determined based on the accumulated data in operation 626. The determination of traffic data may include, for example, processing the accumulated data to determine various characteristics related to trackable targets 118 such a count numbers, direction of movement, velocity, levels of interest, demographics, etc. The traffic data may then be transmitted in operation 628. In one scenario ACDs 116 may transmit traffic data to LCDs 106A . . . n corresponding to locations 108A . . . n in which ACDs 116 reside. In an alternative scenario, LCDs 106A . . . n may get accumulate and process data from sensing devices 112 and 114, and may then provide traffic data to SCD 104. Operation 628 may optionally be followed by a return to operation 614 to resume the image/depth data-based sensing operations.

Consistent with the present disclosure, algorithms may be employed to avoid duplicative counting. Duplicative counting may occur when, for example, a determination cannot be made of the direction of travel of trackable targets 118. This may occur when trackable targets 118 are moving too fast to determine relative direction (e.g., no captured image frames show contour 606 overlapping reference lines 610 or 612), when trackable targets 118 are bunched together in a blob or comprise other objects (e.g., strollers, shopping carts, hand trucks, dollies, forklifts, etc.) that may confuse the determination, when more than one trackable target 118 enters or leaves an aisle at substantially the same time, etc. In at least one embodiment, duplicative counting may be avoided by dividing the aisle into regions that correspond to the visible/depth capture areas of sensing devices 112 and 114. Each sensing device 112 and 114 may then increment a local counter when it is determined that a trackable target 118 entered the region, and may decrement the local counter when it is determined that a trackable target 118 exited a region. The determination of whether trackable targets 118 have entered or exited a region may be performed using some or all of the directional determination discussed above in regard to FIG. 6. Sensing devices 112 and 114 do not have to keep track of particular trackable targets 118, just when any trackable target enters or exits. Ideally, if every trackable target 118 entering a region causes the local counter to increment and every trackable target 118 leaving a region causes the local counter to decrement, then when no trackable targets 118 are detected in the region the local counter should equal zero. However, in view of the above issues the counters may not resolve to zero, and these situations may be deemed unknowns. An unknown may exist when, for example, trackable targets 118 are detected in the region (e.g., by sensing devices 112 or 114) but the local counter is at zero, or when no trackable targets 118 are detected in the region but the local counter is not at zero. Unknowns may also be determined by comparing the number of trackable targets 118 currently observed in a region vs. the current counter value. Unknowns may be resolved by, for example, comparison with other tracking functionality in system 100, by probabilistic measure, etc. In an example of probabilistic measure, a theoretical classification of unknowns may be done in view of left-to-right movement or right-to-left movement in consideration of the ratio of observed left-to-right and/or right-to-left movement. Theoretical percentages may then be employed to approximate the number of unknowns that were left-to-right movements vs. right-to-left movement. The movement approximation may then be used to correct for the unknowns in the traffic data.

Figure 7:
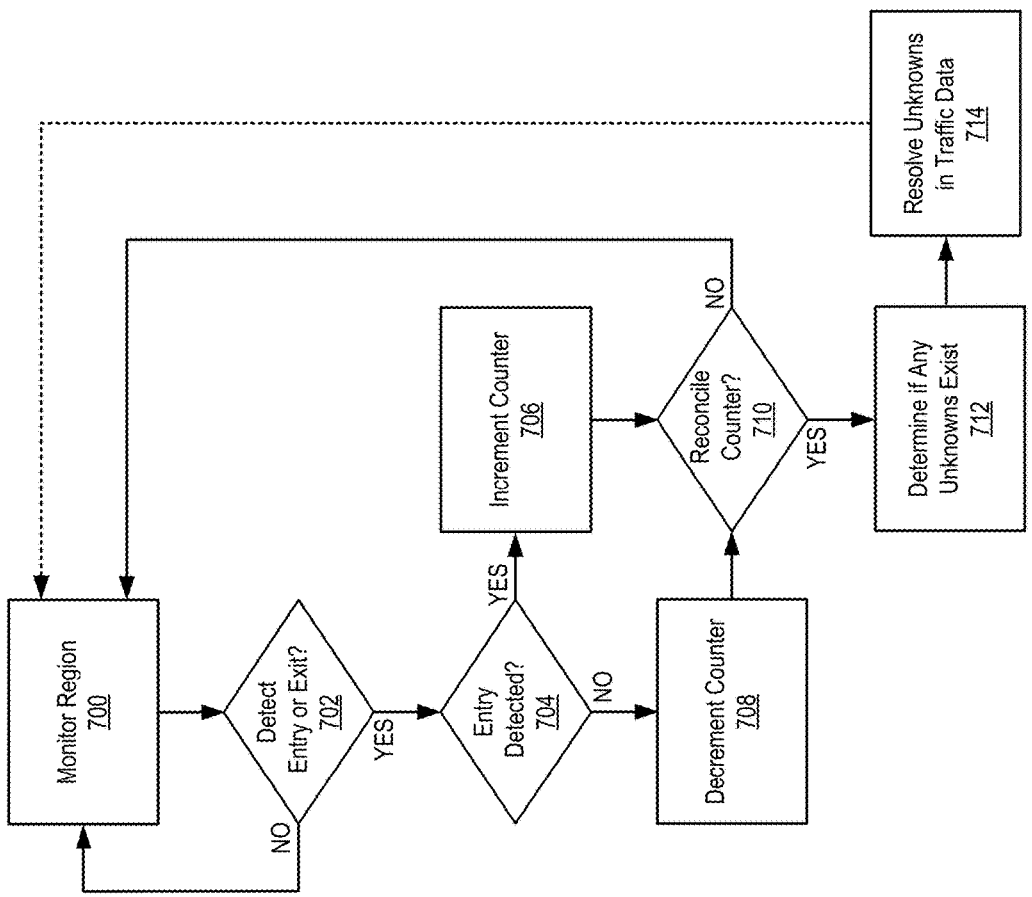
FIG. 7 illustrates example operations to avoid duplicative counting in accordance with at least one embodiment of the present disclosure.

A flowchart describing example operations associated with the above algorithm to avoid duplicative counting is illustrated in FIG. 7. In operation 700 a region may be monitored (e.g., by sensor devices 112 and/or 114) until a determination is made in operation 702 that a trackable target 118 has been sensed entering or exiting the region. A further determination may be made in operation 704 as to whether entry has been detected. If in operation 704 it is determined that entry into the region was detected, then in operation 706 a local counter may be incremented. Otherwise, the detection may correspond to an exit from the region and the local counter may be decremented in operation 708. Following operations 706 or 708 a determination may be made in operation 710 as to whether to reconcile the counter. A determination in operation 710 to not reconcile the counter may be followed by a return to operation 700 to continue monitoring in the region. If in operation 710 it is determined to reconcile the counter, then in operation 712 the existence of unknowns may be determined. An unknown may exist when, for example, the counter value does not correspond to the activity monitored in the region. This may include no activity being monitored in the region when the counter value is not zero, monitoring activity in the region when the counter value is zero, etc. Any unknowns existing in the traffic data may then be resolved in operation 714 (e.g., using methods such as described above). Operation 714 may optionally be followed by a return to operation 700 to continue monitoring in the region.

Figure 8:
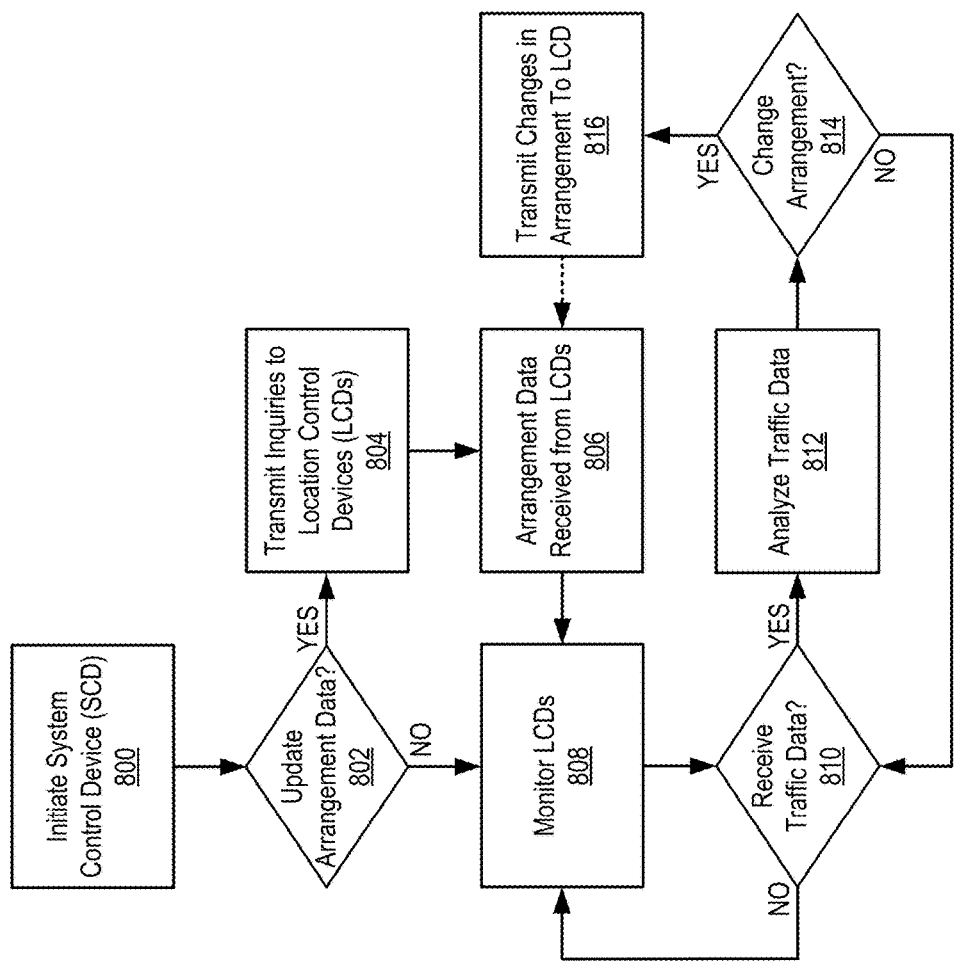
FIG. 8 illustrates example operations for system control in accordance with at least one embodiment of the present disclosure.

FIG. 8 illustrates example operations for system control in accordance with at least one embodiment of the present disclosure. The operations illustrated in FIG. 8 may be performed by, for example, an SCD. In operation 800 at least the SCD may be initiated. A determination may then be made in operation 802 as to whether arrangement data corresponding to locations under control of the SCD needs to be updated. If in operation 802 it is determined that the arrangement data needs to be updated, then in operation 804 inquiries may be transmitted to LCDs that may correspond to the locations under control of the SCD. Arrangement data may be received from the LCDs in operation 806. Arrangement data may comprise, for example, a data that describes the current arrangement of storage areas within the location, the items currently stored in each of the storage locations, characteristics of the items that may limit rearrangement (e.g., size, shape, volatility, needing refrigeration or heating, etc.), etc. A determination in operation 802 that the arrangement data does not need to be updated, or alternatively operation 806, may be followed by operation 808 wherein the LCDs may be monitored by the SCD. Monitoring the LCDs may comprise listening for traffic data transmissions. Monitoring may continue in operation 808 until traffic data is determined to have been received in operation 810. The SCD may then analyze the received traffic data in operation 812. Analyzing the traffic data including determining if any hazards and/or bottlenecks exists in an aisle or proximate to a storage area, determining interest levels in items based on traffic through an aisle, lingering times, return trips to a storage location, etc., determining paths of travel through the location and efficiencies associated with the paths of travel, etc. A determination may then be made in operation 814 as to whether a change in the arrangement is required based on the analysis. A determination in operation 814 that no change in arrangement is required may be followed by a return to operation 810 to continue monitoring the LCDs. If in operation 814 it is determined that a change in arrangement is required, then in operation 816 a change in arrangement may be transmitted to the LCD. Transmitting the change in arrangement may include, for example, transmitting at least one signal to the LCD including data instructing how the arrangement of storage areas should be altered in the location, how the arrangement of items stored in storage areas should be altered, etc. Optionally, operation 816 may be followed by a return to operation 806 to allow the SCD to receive confirmation that the new arrangement has been implemented from the LCD.

Figure 9:
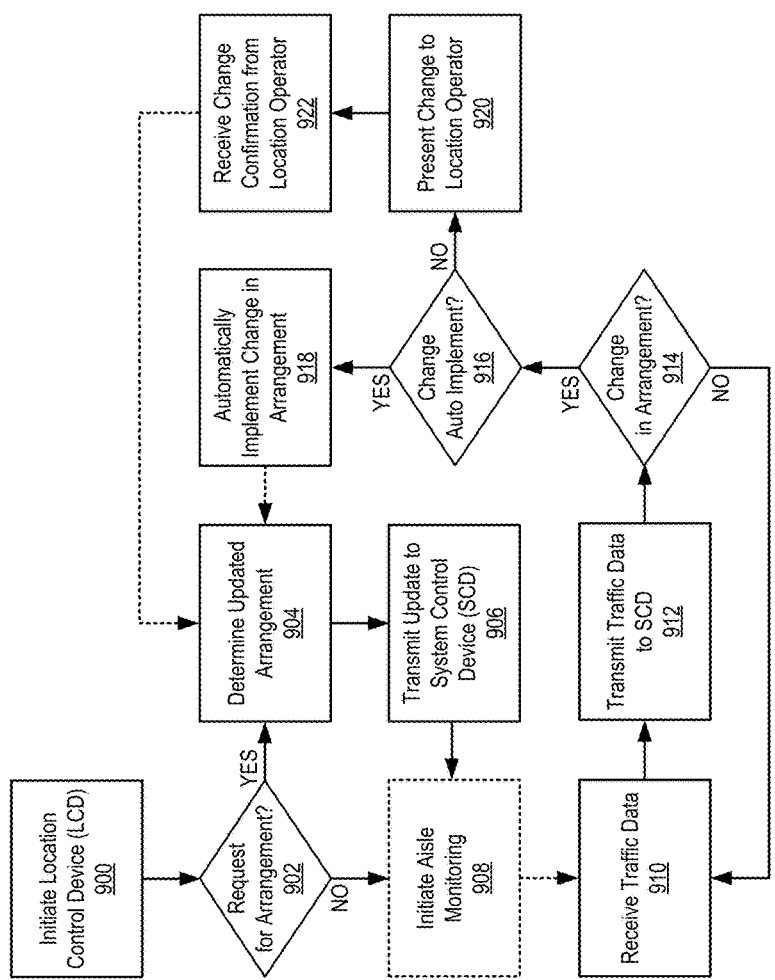
FIG. 9 illustrates example operations for location control in accordance with at least one embodiment of the present disclosure.

FIG. 9 illustrates example operations for location control in accordance with at least one embodiment of the present disclosure. The operations illustrated in FIG. 9 may be performed by, for example, an LCD. In operation 900 the LCD may be initiated. A determination may then be made in operation 902 as to whether a request for arrangement data was received from the SCD. If in operation 902 it is determined that a request for location data was received from the SCD, then in operation 904 updated arrangement data may be determined. For example, the LCD may transmit a request to all of the ACDs in the location requesting updated configuration data for the aisles being monitored by the ACDs. The updated arrangement data may then be transmitted to the SCD in operation 906.

Optional operation 908 may follow a determination in operation 902 that a request for updated arrangement data has not been received, or alternatively following operation 906. In operation 908 aisle monitoring may be initiated. Initiating aisle monitoring may comprise, for example, initiating the ACDs in the location (e.g., in implementations using ACDs), initiating and/or calibrating the sensing devices, initiating data capture in the sensing devices, etc. Operation 908 may be optional in situations where the ACDs may automatically initiate themselves and initiate and/or calibrate the sensing devices prior to initiating monitoring. Traffic data may then be received in the LCD in operation 910, and the LCD may proceed to forward the traffic data to the SCD in operation 912. A determination may then be made in operation 914 as to whether a change in arrangement has been received. A determination that a change in arrangement has not been received may be followed by a return to operation 910 to continue receiving traffic data.

If in operation 914 it is determined that a change in arrangement has been received, then in operation 916 a further determination may be made as to whether the change in arrangement may be implemented automatically. Automatic implementation of arrangement changes may be possible in certain locations such as, for example, automatic warehouses wherein automation may shift storage areas, items associated with storage areas, etc. without human intervention. These locations may comprise modular storage, movable shelving, conveyors, robotic pickers, etc. that may automatically affect change. Otherwise, changes in arrangement may be presented to humans (e.g., a location operator) for implementation. Returning to the operational flow, if in operation 916 it is determined that automatic implementation of the change in arrangement is possible then in operation 918 the change may be implemented automatically. Operation 918 may optionally be followed by a return to operation 904 to confirm the change in arrangement to the SCD. If in operation 916 it is determined that automatic implementation is not possible, then in operation 920 the change in arrangement may be presented to a location operator (e.g., may be indicated by a visible, audible or tactile alert, displayed on a monitor, printed out on paper, etc.). Following implementation of the change in arrangement, a change confirmation may be received from the location operator in operation 922, which similar to operation 918 may optionally be followed by a return to operation 904 to confirm the change in arrangement to the SCD.

While FIGS. 6 to 9 illustrate operations according to different embodiments, it is to be understood that not all of the operations depicted in FIGS. 6 to 9 are necessary for other embodiments. Indeed, it is fully contemplated herein that in other embodiments of the present disclosure, the operations depicted in FIGS. 6 to 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software circuitry executed by a programmable control device.

Thus, this disclosure is directed to a system for optimizing storage area arrangement. A system control device may manage location control devices in various locations. Each location may comprise storage areas accessible to trackable targets. At least a portion of the storage areas may be arranged in parallel to form aisles that may be monitored by aisle monitoring equipment. The monitoring equipment may comprise at least two sensing devices capable of capturing data such as, for example, a count of trackable objects accessing an aisle or a storage area, time spent within the aisle or proximate to a storage area, characteristics of the trackable object (e.g., gender, age, etc.), etc. The captured data may then be analyzed by the system control device to determine whether a change in arrangement is necessary. A change in arrangement may help to alleviate bottlenecks, improve the efficiency of paths taken through the aisles/storage areas, etc.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for optimizing storage location arrangement.

According to example 1 there is provided a device to control storage location arrangement. The device may comprise communication circuitry to communicate with at least one location control device corresponding to a location including storage areas that are accessible to trackable targets, memory circuitry to store at least arrangement data and traffic data for the location received from the at least one location control device via the communication circuitry and processing circuitry to analyze the traffic data, determine if a change in arrangement for the storage areas in the location is required based on the analysis and provide a change in arrangement to the at least one location control device via the communication circuitry based on the change in arrangement determination.

Example 2 may include the elements of example 1, wherein at least a portion of the storage areas are arranged in parallel forming at least one aisle between the storage areas, and the traffic data is accumulated for each aisle by at least two sensing devices to capture at least visible data and depth data.

Example 3 may include the elements of example 2, wherein first and second sensing devices are arranged at ends of the aisle on opposing sides of the aisle, and third and fourth sensing devices are arranged at a midpoint of the aisle on opposing sides of the aisle, the third and fourth sensing devices sensing with higher precision but at shorter range that then first and second sensing devices.

Example 4 may include the elements of any of examples 2 to 3, wherein the traffic data comprises at least one of a count of trackable targets passing through the at least one aisle, a rate at which the at least one trackable target passes through the at least one aisle, a duration that the trackable targets pause adjacent to at least one storage area or characteristic data corresponding to the trackable targets.

Example 5 may include the elements of example 4, wherein in analyzing the traffic data the processing circuitry is to at least one of determine how often storage areas are being accessed by the trackable targets, determine bottlenecks occurring proximate to storage areas or in the at least one aisle, or determine paths followed by the trackable targets through the location and efficiencies associated with the target paths.

Example 6 may include the elements of any of examples 1 to 5, wherein the traffic data comprises at least one of a count of trackable targets passing through the at least one aisle, a rate at which the at least one trackable target passes through the at least one aisle, a duration that the trackable targets pause adjacent to at least one storage area or characteristic data corresponding to the trackable targets, and in analyzing the traffic data the processing circuitry is to at least one of determine how often storage areas are being accessed by the trackable targets, determine bottlenecks occurring proximate to storage areas or in the at least one aisle, or determine paths followed by the trackable targets through the location and efficiencies associated with the target paths.

Example 7 may include the elements of any of examples 1 to 6, wherein the arrangement data comprises data describing at least one of an arrangement of storage areas in the location or an arrangement of items stored within each of the storage areas.

Example 8 may include the elements of example 7, wherein in providing a change in arrangement the processing circuitry is to transmit to the at least one location controller a signal including data instructing how to rearrange at least one storage area within the location.

Example 9 may include the elements of any of examples 1 to 8, wherein the arrangement data comprises data describing at least one of an arrangement of storage areas in the location or an arrangement of items stored within each of the storage areas, and in providing a change in arrangement the processing circuitry is to transmit to the at least one location controller a signal including data instructing how to rearrange at least one storage area within the location.

Example 10 may include the elements of any of examples 1 to 9, wherein the location is a retail establishment.

Example 11 may include the elements of any of examples 1 to 10, wherein the location is an automated warehouse.

Example 12 may include the elements of any of examples 1 to 11, wherein the storage area is at least one of floor space, a closet, a cabinet, a rack, a shelf, a drawer, a bin or a tank.

Example 13 may include the elements of any of examples 1 to 12, wherein the trackable targets are at least one of people or robotic devices.

According to example 14 there is provided a device to control a storage location. The device may comprise communication circuitry to communicate with at least one of a system control device or aisle monitoring equipment corresponding to an aisle in a location, the aisle being formed by a parallel arrangement of storage areas that are accessible to trackable targets, memory circuitry to store at least arrangement data and traffic data for the location and processing circuitry to receive the traffic data from aisle monitoring equipment and provide the traffic data to the system control device via the communication circuitry.

Example 15 may include the elements of example 14, wherein the aisle monitoring equipment comprises at least first and second sensing devices are arranged at ends of the aisle on opposing sides of the aisle, and third and fourth sensing devices are arranged at a midpoint of the aisle on opposing sides of the aisle, the third and fourth sensing devices sensing with higher precision but at shorter range that then first and second sensing devices.

Example 16 may include the elements of example 15, wherein the aisle monitoring equipment further comprises an aisle control device to at least receive traffic data from the first, second, third and fourth sensing devices and provide the traffic data to the device.

Example 17 may include the elements of any of examples 14 to 16, wherein the processing circuitry is further to receive data from the system control device via the communication circuitry, the data indicating a change to the arrangement of the location.

Example 18 may include the elements of example 17, wherein the processing circuitry is further to implement the change in arrangement in the location automatically or present the change in arrangement data to a location operator.

According to example 19 there is provided a sensing device. The device may comprise sensing circuitry to generate sensing data by monitoring a region and processing circuitry to at least determine if a trackable target has entered or exited the region based on the sensing data, increment a local counter based on an entry determination, decrement the local counter based on an exit determination, reconcile the local counter based on current sensing data and generate traffic data based on the sensing data.

Example 20 may include the elements of example 19, wherein the region is defined by a sensing range of the sensing device.

Example 21 may include the elements of any of examples 19 to 20, wherein in reconciling the local counter the processing circuitry is to determine unknowns based on at least one of the current sensing data indicating a trackable target is present in the region while the local counter has a value of zero or the current sensing data indicating that no trackable targets are present when the local counter has a value that is not zero and resolve the unknowns in the traffic data.

Example 22 may include the elements of example 21, wherein in resolving the unknowns the processing circuitry is to at least one of determine values for the unknowns by comparison with other tracking functionality or approximate values for the unknowns using probabilistic measure.

According to example 23 there is provided a method for controlling storage location arrangement. The method may comprise receiving at least arrangement data and traffic data corresponding to a location including storage areas that are accessible to trackable targets, analyzing the traffic data, determining if a change in arrangement for the storage areas in the location is required based on the analysis and providing a change in arrangement to the at least one location control device via the communication circuitry based on the change in arrangement determination.

Example 24 may include the elements of example 23, wherein at least a portion of the storage areas are arranged in parallel forming at least one aisle between the storage areas, and the traffic data is accumulated for each aisle by capturing at least visible data and depth data.

Example 25 may include the elements of example 24, wherein the traffic data comprises at least one of a count of trackable targets passing through the at least one aisle, a rate at which the at least one trackable target passes through the at least one aisle, a duration that the trackable targets pause adjacent to at least one storage area or characteristic data corresponding to the trackable targets.

Example 26 may include the elements of example 25, wherein analyzing the traffic data comprises at least one of determining how often storage areas are being accessed by the trackable targets, determining bottlenecks occurring proximate to storage areas or in the at least one aisle or determining paths followed by the trackable targets through the location and efficiencies associated with the target paths.

Example 27 may include the elements of any of examples 23 to 26, and may further comprise determining if any location comprises updated arrangement data, requesting updated arrangement data from any location determined to comprise updated arrangement data and receiving updated arrangement data.

Example 28 may include the elements of any of examples 23 to 27, wherein the arrangement data comprises data describing at least one of an arrangement of storage areas in the location or an arrangement of items stored within each of the storage areas.

Example 29 may include the elements of example 28, wherein providing a change in arrangement comprises transmitting a signal including data instructing how to rearrange at least one storage area within the location.

Example 30 may include the elements of any of examples 23 to 29, wherein the arrangement data comprises data describing at least one of an arrangement of storage areas in the location or an arrangement of items stored within each of the storage areas, and providing a change in arrangement comprises transmitting a signal including data instructing how to rearrange at least one storage area within the location.

According to example 31 there is provided a method to avoid duplicative counting. The method may comprise generating sensing data by monitoring a region utilizing at least one sensing device, determining if a trackable target has entered or exited the region based on the sensing data, incrementing a local counter based on an entry determination, decrementing the local counter based on an exit determination, reconciling the local counter based on current sensing data and generating traffic data based on the sensing data.

Example 32 may include the elements of example 31, wherein the region is defined by a sensing range of the sensing device.

Example 33 may include the elements of any of examples 31 to 32, wherein reconciling the local counter comprises determining unknowns based on at least one of the current sensing data indicating a trackable target is present in the region while the local counter has a value of zero or the current sensing data indicating that no trackable targets are present when the local counter has a value that is not zero and resolving the unknowns in the traffic data.

Example 34 may include the elements of example 33, wherein resolving the unknowns comprises at least one of determining values for the unknowns by comparison with other tracking functionality or approximating values for the unknowns using probabilistic measure.

According to example 35 there is provided a system including at least one device, the system being arranged to perform the method of any of the above examples 23 to 34.

According to example 36 there is provided a chipset arranged to perform the method of any of the above examples 23 to 34.

According to example 37 there is provided at least one machine readable medium comprising a plurality of instructions that, in response to be being executed on a computing device, cause the computing device to carry out the method according to any of the above examples 23 to 34.

According to example 38 there is provided at least one device capable of controlling storage location arrangement, the at least one device being arranged to perform the method of any of the above examples 23 to 34.

According to example 39 there is provided a system for controlling storage location arrangement. The system may comprise means for receiving at least arrangement data and traffic data corresponding to a location including storage areas that are accessible to trackable targets, means for analyzing the traffic data, means for determining if a change in arrangement for the storage areas in the location is required based on the analysis and means for providing a change in arrangement to the at least one location control device via the communication circuitry based on the change in arrangement determination.

Example 40 may include the elements of example 39, wherein at least a portion of the storage areas are arranged in parallel forming at least one aisle between the storage areas, and the traffic data is accumulated for each aisle by capturing at least visible data and depth data.

Example 41 may include the elements of example 40, wherein the traffic data comprises at least one of a count of trackable targets passing through the at least one aisle, a rate at which the at least one trackable target passes through the at least one aisle, a duration that the trackable targets pause adjacent to at least one storage area or characteristic data corresponding to the trackable targets.

Example 42 may include the elements of example 41, wherein the means for analyzing the traffic data comprise at least one of means for determining how often storage areas are being accessed by the trackable targets, means for determining bottlenecks occurring proximate to storage areas or in the at least one aisle or means for determining paths followed by the trackable targets through the location and efficiencies associated with the target paths.

Example 43 may include the elements of any of examples 39 to 42, and may further comprise means for determining if any location comprises updated arrangement data, means for requesting updated arrangement data from any location determined to comprise updated arrangement data and means for receiving updated arrangement data.

Example 44 may include the elements of any of examples 39 to 43, wherein the arrangement data comprises data describing at least one of an arrangement of storage areas in the location or an arrangement of items stored within each of the storage areas.

Example 45 may include the elements of example 44, wherein the means for providing a change in arrangement comprise means for transmitting a signal including data instructing how to rearrange at least one storage area within the location.

Example 46 may include the elements of any of examples 39 to 45, wherein the arrangement data comprises data describing at least one of an arrangement of storage areas in the location or an arrangement of items stored within each of the storage areas, and the means for providing a change in arrangement comprise means for transmitting a signal including data instructing how to rearrange at least one storage area within the location.

According to example 47 there is provided a system to avoid duplicative counting. The system may comprise means for generating sensing data by monitoring a region utilizing at least one sensing device, means for determining if a trackable target has entered or exited the region based on the sensing data, means for incrementing a local counter based on an entry determination, means for decrementing the local counter based on an exit determination, means for reconciling the local counter based on current sensing data and means for generating traffic data based on the sensing data.

Example 48 may include the elements of example 47, wherein the region is defined by a sensing range of the sensing device.

Example 49 may include the elements of any of examples 47 to 48, wherein the means for reconciling the local counter comprise means for determining unknowns based on at least one of the current sensing data indicating a trackable target is present in the region while the local counter has a value of zero or the current sensing data indicating that no trackable targets are present when the local counter has a value that is not zero and means for resolving the unknowns in the traffic data.

Example 50 may include the elements of example 49, wherein the means for resolving the unknowns comprises at least one of determining values for the unknowns by comparison with other tracking functionality or approximating values for the unknowns using probabilistic measure.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system for optimizing storage location arrangement, comprising:
    at least one sensing device to generate traffic data for a location including storage areas that are accessible to trackable targets, wherein the at least one sensing device is to generate said traffic data at least in part by capturing depth data for said location, determining a contour from said depth data corresponding to at least one trackable target within said location, and comparing the contour to one or more reference lines; and remote resources comprising communication circuitry, processor circuitry, and memory circuitry, wherein:
the communication circuitry is to receive traffic data produced by said at least one sensing device;
the memory circuitry is to store arrangement data for the location and said traffic data; and
the processing circuitry is to analyze the traffic data, determine if a change in arrangement for the storage areas in the location is required based on the analysis and provide a change in arrangement for the storage areas based on the change in arrangement determination.

2. The system of claim 1, further comprising aisle monitoring equipment, wherein:
said aisle monitoring equipment is configured to receive said traffic information from said at least one sensing device and transmit said traffic data to said communication circuitry of remote resources.

3. The system of claim 1, wherein the arrangement data comprises data describing at least one of an arrangement of storage areas in the location or an arrangement of items stored within each of the storage areas.

4. The system of claim 3, wherein:
said remote resources includes a system control device and a location device, the system control device comprising said communication circuitry, memory circuitry, and processing circuitry; and
in providing a change in arrangement the processing circuitry is to transmit to the at least one location control device a signal including data instructing how to rearrange at least one storage area within the location.

5. The system of claim 1, wherein said traffic data comprises a velocity of at least one trackable target, and the at least one sensing device is further to generate said traffic data at least in part by determining whether said contour overlies said at least one reference line in a first image frame, and then determining whether a position of the contour has changed relative to the at least one reference line in a subsequent image frame.

6. The system of claim 5, wherein the at least one sensing device is further to generate said traffic data at least in part by determining how many frames it takes for said contour to traverse said at least one reference line.

7. The system of claim 1, wherein:
at least a portion of the storage areas are arranged in parallel so as to form an aisle between the storage areas; and
said at least one sensing device comprises at least first and second sensing devices that are configured to generate said traffic data at least in part by capturing depth data for said location, determining a contour from said depth data corresponding to at least one trackable target within said location, and comparing the contour to one or more reference lines.

8. The system of claim 7, wherein:
the at least one sensing device further comprises third and fourth sensing devices;
the first and second sensing devices are arranged at ends of the aisle on opposing sides of the aisle;
the third and fourth sensing devices are arranged at a midpoint of the aisle and on opposing sides of the aisle; and
the third and fourth sensing devices are configured to sense with higher precision but at shorter range that then first and second sensing devices.

9. The system of claim 7, wherein the traffic data comprises at least one of a count of trackable targets passing through the aisle, a rate at which the at least one trackable target passes through the aisle, a duration that one or more of the trackable targets pause adjacent to at least one storage area or characteristic data corresponding to the trackable targets.

10. The system of claim 9, wherein in analyzing the traffic data the processing circuitry is to at least one of determine how often storage areas are being accessed by the trackable targets, determine bottlenecks occurring proximate to storage areas or in the aisle, or determine paths followed by the trackable targets through the location and efficiencies associated with the target paths.

11. A method for controlling storage location arrangement, comprising:
generating traffic data with at least one sensing device for a location including storage areas that are accessible to trackable targets, said generating comprising capturing depth data for said location, determining a contour corresponding to at least one trackable target within said location, and comparing the contour to one or more reference lines;
receiving, with remote resources comprising communication circuitry, memory circuitry, and processing circuitry, at least arrangement data and said traffic data corresponding to said location;
analyzing the traffic data with the processing circuitry;
determining, with the processing circuitry, if a change in arrangement for the storage areas in the location is required based on the analysis; and
providing, with the processing circuitry, a change in arrangement to the at least one location control device via the communication circuitry based on the change in arrangement determination.

12. The method of claim 11, further comprising:
determining if any location comprises updated arrangement data;
requesting updated arrangement data from any location determined to comprise updated arrangement data; and
receiving updated arrangement data.

13. The method of claim 11, wherein the arrangement data comprises data describing at least one of an arrangement of storage areas in the location or an arrangement of items stored within each of the storage areas.

14. The method of claim 13, wherein providing a change in arrangement comprises causing the communication circuitry to transmit a signal including data instructing how to rearrange at least one storage area within the location.

15. The method of claim 11, wherein:
at least a portion of the storage areas are arranged in parallel so as to form an aisle between the storage areas; and
said at least one sensing device comprises at least first and second sensing devices that are configured to generate said traffic data at least in part by capturing depth data for said location, determining a contour from said depth data corresponding to at least one trackable target within said location, and comparing the contour to one or more reference lines.

16. The method of claim 15, wherein the traffic data comprises at least one of a count of trackable targets passing through the aisle, a rate at which the at least one trackable target passes through the aisle, a duration that the trackable targets pause adjacent to at least one storage area or characteristic data corresponding to the trackable targets.

17. The method of claim 16, wherein analyzing the traffic data comprises at least one of:
- determining how often storage areas are being accessed by the trackable targets;
- determining bottlenecks occurring proximate to storage areas or in the aisle; or
- determining paths followed by the trackable targets through the location and efficiencies associated with the target paths.

18. At least one machine-readable storage medium having stored thereon, individually or in combination, instructions for controlling storage location arrangement that, when executed by one or more processors, result in performance of the following operations comprising:
- generating traffic data with at least one sensing device for a location including storage areas that are accessible to trackable targets at least in part by capturing depth data for said location, determining a contour corresponding to at least one trackable target within said location, and comparing the contour to one or more reference lines;
- receiving, with remote resources comprising communication circuitry, memory circuitry, and processing circuitry, at least arrangement data and said traffic data;
- analyze the traffic data with the processing circuitry;
- determine, with the processing circuitry, if a change in arrangement for the storage areas in the location is required based on the analysis; and
- provide, with the processing circuitry, a change in arrangement to the at least one location control device via the communication circuitry based on the change in arrangement determination.

19. The storage medium of claim 18, further comprising instructions that, when executed by one or more processors, cause the one or more processors to:
- determine if any location comprises updated arrangement data;
- request updated arrangement data from any location determined to comprise updated arrangement data; and
- receive updated arrangement data.

20. The storage medium of claim 18, wherein the arrangement data comprises data describing at least one of an arrangement of storage areas in the location or an arrangement of items stored within each of the storage areas.

21. The storage medium of claim 20, wherein the instructions to provide a change in arrangement comprise instructions to cause said communications circuitry to transmit a signal including data instructing how to rearrange at least one storage area within the location.

22. The storage medium of claim 18, wherein:
- at least a portion of the storage areas are arranged in parallel so as to form an aisle between the storage areas; and
- said at least one sensing device comprises at least first and second sensing devices that are configured to generate said traffic data at least in part by capturing depth data for said location, determining a contour from said depth data corresponding to at least one trackable target within said location, and comparing the contour to one or more reference lines.

23. The storage medium of claim 22, wherein the traffic data comprises at least one of a count of trackable targets passing through the aisle, a rate at which the at least one trackable target passes through the aisle, a duration that the trackable targets pause adjacent to at least one storage area or characteristic data corresponding to the trackable targets.

24. The storage medium of claim 23, wherein the instructions to analyze the traffic data comprise instructions to at least one of:
- determine how often storage areas are being accessed by the trackable targets;
- determine bottlenecks occurring proximate to storage areas or in the at least one aisle; or
- determine paths followed by the trackable targets through the location and efficiencies associated with the target paths.

* * * * *